UNITED STATES PATENT OFFICE.

RENÉ BOHN, OF MANNHEIM, GERMANY, ASSIGNOR TO BADISCHE ANILIN & SODA FABRIK, OF LUDWIGSHAFEN-ON-THE-RHINE, GERMANY, A CORPORATION.

NEW ANTHRACENE DYES AND PROCESS OF MAKING SAME.

1,280,648.  Specification of Letters Patent.  Patented Oct. 8, 1918.

No Drawing.  Application filed May 8, 1915.  Serial No. 26,696.

*To all whom it may concern:*

Be it known that I, RENÉ BOHN, citizen of the Swiss Republic, residing at Mannheim, Germany, have invented new and useful Improvements in New Anthracene Dyes and Processes of Making Same, of which the following is a specification.

This invention relates to new coloring matters of the anthracene series containing a nucleus represented by the following formula

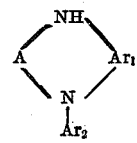

in which A represents the residue of anthraquinone, or of a substituted anthraquinone, while $Ar_1$ and $Ar_2$ are two equal, or different, aromatic residues, either substituted or not. The production of the said coloring matters can be carried out by reacting an aromatic amin with an anthraquinone-beta-arylid, which may be substituted in the anthraquinone residue or in the arylamin residue or in both, in the presence of strong alkali (which term includes caustic alkalis and alkali alcoholates), and preferably in the presence of an oxidizing agent. In certain cases the process of producing the new coloring matters and the production of the anthraquinone-beta-arylid can, if desired, be effected in one operation, viz., by heating the compounds which give rise to the formation of a beta-arylido-anthraquinone (for example an anthraquinone-beta-sulfonic acid, or derivative thereof, and an aromatic amino compound, or a beta-halogen-anthraquinone and an aromatic amin) in the presence of strong alkali and preferably in the presence of an oxidizing agent, and continuing the treatment until the desired condensation is effected.

The new coloring matters are greenish or bluish powders, soluble in concentrated sulfuric acid with bottle-green to olive-green color. If the molecule contains no sulfonic acid group, they are insoluble in water, aqueous acids and alkalis and soluble in organic solvents, while they are soluble in water, aqueous acids and alkalis and in some organic solvents, such as alcohol, acetone, if the molecule contains at least one sulfonic acid group. The unsulfonated dyes can be used in the production of colored varnishes, in particular of colored oil- or spirit-varnishes, or for other purposes, while the products containing sulfonic acid groups dye wool with fast greenish or bluish shades. The coloring matters containing sulfonic acid groups can be produced from the unsulfonated bodies by treating them with sulfonating agents in the usual manner, and the products may vary according as the treatment is effected with fuming, concentrated or somewhat aqueous sulfuric acid, or with chloro-sulfonic acid, and in the presence or absence of boric acid.

The following examples will serve to further illustrate the nature of this invention which however is not confined to these examples. The parts are by weight.

Example 1.

Heat about two hundred parts of anilin to a temperature of 180° centigrade and add four parts of powdered caustic potash and ten parts of beta-anilido-anthraquinone. Maintain the temperature for about two hours at from 180° to 182° centigrade, while stirring and passing air through the melt. Allow it to stand for a short time and then collect by filtration. Stir the precipitate, which contains anilin, to a paste with water and pass air through the mixture until any leuco-compounds present are fully oxidized. Then free the product from anilin by treatment with dilute hydrochloric acid and dry it. The product obtained according to this example corresponds to the formula

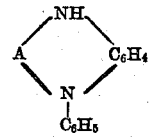

Other methods of working up can be employed; for instance, the reaction mixture can be treated directly with dilute hydrochloric acid and the crude product dried and extracted from cold acetone to free it from impurities. Further the product can be dissolved in anilin and precipitated with alcohol in order to purify it. Acicular crystals with a bronze luster are obtained by proceeding as aforesaid which crystals dissolve in organic solvents, the solution being blue. Instead of using anilin only in this example, a mixture of alinin and an indifferent solvent, such, for instance, as naphthalene, can be used and further anilin can be replaced by other aromatic amino compounds.

*Example 2.*

Heat one thousand parts of anilin to boiling point, and, when any water has distilled off, add, at a temperature of 180° centigrade and while stirring, fifty parts of a mixture of caustic soda and caustic potash in molecular proportions and one hundred parts of anthraquinone-2-sulfo acid sodium salt. Maintain the temperature at 180° centigrade for about eight hours while stirring continually and passing a current of air through the melt. The formation of beta-arylido-anthraquinone and the condensation of that body with anilin are thus effected in one operation and a product corresponding to that of the foregoing Example 1 is obtained. Separate the crude product from the anilin and extract it with dilute alkali, or ammonia, to remove any hydroxy-anthraquinones, that may have been formed. Extract with cold acetone. Para-toluidin, or other aromatic amins can be used instead of anilin, giving rise to the corresponding derivatives.

Beta-chlor-anthraquinone can be used instead of the anthraquinone-2-sulfo acid, but, in this case, it is desirable to add a copper compound to the melt to promote the reaction and anthraquinone is obtained as a by-product, and can be separated from the new product by fractional crystallization.

*Example 3.*

Add two parts of the condensation product from beta-anilido-anthraquinone and anilin, such as can be obtained according to either of the foregoing Examples 1 and 2, to twenty parts of fuming sulfuric acid containing 23 per cent. of free $SO_3$. Stir for about twenty-two hours at about 80° centigrade, then pour the melt into cold water and treat it, in the cold, for a short time with a solution of ferrous sulfate and then precipitate the coloring matter by addition of common salt. In this form the new product dyes wool, from the acid bath, bluish green shades possessing excellent fastness against the action of light.

*Example 4.*

Add two parts of the condensation product, such as can be obtained according to the foregoing Examples 1 and 2, to a mixture of four parts of boric acid, free from water, and twenty parts of fuming sulfuric acid containing about 23 per cent. of free $SO_3$. Heat the mixture for about fifty hours at a temperature of about 90° centigrade, and, after cooling, pour the melt into water and work up in the usual way. The coloring matter thus obtained will dye wool fast, pure blue shades. If desired the coloring matter can be further sulfonated.

Now what I claim is:

1. As new article of manufacture the new dye of the anthracene series containing a nucleus represented by the following formula

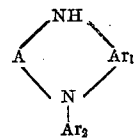

(in which A represents the residue of an anthraquinonic body, while $Ar_1$ and $Ar_2$ are two aromatic residues) which coloring matters are greenish or bluish bodies and in the unsulfonated form are insoluble in water and soluble in organic solvents and can be employed for coloring varnishes, while in the sulfonated form they are soluble in water and aqueous acids and alkalis and can be used for dyeing wool.

2. As new article of manufacture the new anthracene dye containing a nucleus which is represented by the following formula

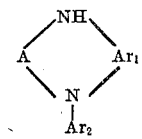

(in which A represents an anthraquinonic residue, while $Ar_1$ and $Ar_2$ are benzenic residues), which are greenish or bluish bodies, soluble in concentrated sulfuric acid with bottle-green to olive-green colors, and which in the unsulfonated form are insoluble in water, aqueous acids and alkalis and soluble in organic solvents while those containing at least one sulfonic acid group are soluble in water, aqueous acids and alkalis and in some organic solvents.

3. As new article of manufacture the new anthracene dye containing a nucleus which is represented by the following formula

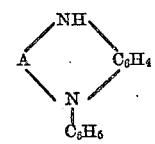

(in which A represents an anthraquinonic residue) which contains at least one sulfonic acid group and is soluble in water, dilute acids and alkalis, soluble in alcohol, acetone, insoluble in benzene and nitro-benzene, the aqueous solution of which dyes wool with greenish blue shades of good fastness.

4. The process of producing coloring matters of the anthracene series by condensing a beta-arylido-anthraquinone with an aromatic amino compound in the presence of strong alkali until a product corresponding to the formula

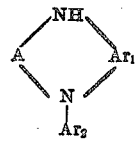

(in which A represents the residue of an anthraquinonic body, while $Ar_1$ and $Ar_2$ are aromatic residues) has been produced.

5. The process of producing coloring matters of the anthracene series by condensing a beta-arylido-anthraquinone with an aromatic amino compound in the presence of strong alkali and of an oxidizing agent until a product corresponding to the formula

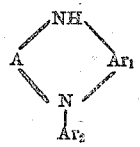

(in which A represents the residue of an anthraquinonic body, while $Ar_1$ and $Ar_2$ are aromatic residues) has been produced.

6. The process of producing coloring matters of the anthracene series by condensing a beta-arylido-anthraquinone with an aromatic amino compound in the presence of strong alkali and of an oxidizing agent until a product corresponding to the formula

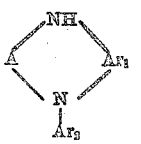

(in which A represents the residue of an anthraquinonic body, while $Ar_1$ and $Ar_2$ are aromatic residues) has been produced and treating the product with a sulfonating agent.

7. The process of producing coloring matters of the anthracene series by condensing substances which on treating with strong alkali can give rise to the formation of beta-arylido-anthraquinones, with an aromatic amino compound in the presence of strong alkali until a product corresponding to the formula

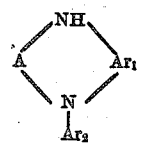

(in which A represents the residue of an anthraquinonic body, while $Ar_1$ and $Ar_2$ are aromatic residues) is produced.

8. The process of producing coloring matters of the anthracene series by condensing substances which on treating with strong alkali can give rise to the formation of beta-arylido-anthraquinones, with an aromatic amino compound in the presence of strong alkali and of an oxidizing agent until a product corresponding to the formula

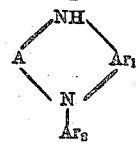

(in which A represents the residue of an anthraquinonic body, while $Ar_1$ and $Ar_2$ are aromatic residues) is produced.

9. The process of producing coloring matters of the anthracene series by condensing substances which on treating with strong alkali can give rise to the formation of beta-arylido-anthraquinones with an aromatic amino compound in the presence of strong alkali and of an oxidizing agent until a product corresponding to the formula

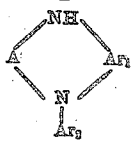

(in which A represents the residue of an anthraquinonic body, while $Ar_1$ and $Ar_2$ are aromatic residues) is produced, and sulfonating the product thus obtained.

In testimony whereof I have hereunto set my hand in the presence of two subscribing witnesses.

RENÉ BOHN.

Witnesses:
  JOHANNES SCHMID,
  C. INNESS BROWN.